(12) United States Patent
Kim et al.

(10) Patent No.: US 7,574,003 B2
(45) Date of Patent: Aug. 11, 2009

(54) RECORDING MEDIUM, APPARATUS FOR FORMING THE RECORDING MEDIUM, AND APPARATUS AND METHOD FOR REPRODUCING THE RECORDING MEDIUM

(75) Inventors: Jin Yong Kim, Kyunggi-do (KR); Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 659 days.

(21) Appl. No.: 10/780,756

(22) Filed: Feb. 19, 2004

(65) Prior Publication Data

US 2004/0223427 A1 Nov. 11, 2004

(51) Int. Cl.
*H04N 7/167* (2006.01)
(52) U.S. Cl. .................. 380/202; 380/201; 380/203
(58) Field of Classification Search .............. 380/201, 380/202, 203; 369/275.4
See application file for complete search history.

(56) References Cited

U.S. PATENT DOCUMENTS

| | | |
|---|---|---|
| 4,907,216 A | 3/1990 | Rijnsburger |
| 5,051,998 A | 9/1991 | Murai et al. |
| 5,513,260 A | 4/1996 | Ryan |
| 5,538,773 A | 7/1996 | Kondo |
| 5,572,507 A | 11/1996 | Ozaki et al. |
| 5,706,047 A | 1/1998 | Lentz et al. |
| 5,706,268 A | 1/1998 | Horimai |
| 5,724,327 A | 3/1998 | Timmermans et al. |
| 5,737,286 A | 4/1998 | Timmermans et al. |
| 5,936,933 A | 8/1999 | Miyamoto et al. |
| 5,940,364 A | 8/1999 | Ogata et al. |

(Continued)

FOREIGN PATENT DOCUMENTS

CN 1313599 A 9/2001

(Continued)

OTHER PUBLICATIONS

Memorex, White Paper Reference Guide Optical Media, Mar. 24, 2006.*

(Continued)

*Primary Examiner*—David Y Jung
(74) *Attorney, Agent, or Firm*—Harness, Dickey & Pierce (57) ABSTRACT

Disclosed herein are a recording medium, an apparatus for forming the recording medium, and an apparatus and method for reproducing the recording medium. CPI (Copy Protection-related Information), identification information (CPI_Flag) indicative of recording or non-recording of the CPI, and/or a plurality of contents specific information (CSI) with different formats are recorded in a PIC (Permanent Information & Control data) zone of a high-density optical disc such as a BD-ROM (Blu-ray Disc-ROM). A formatting operation and mastering operation are performed under the condition that control data including the CPI, CPI_Flag and/or CSI is separated from main data. An optical disc device judges whether the optical disc has been illegally copied, with reference to the CPI, CPI_Flag and/or CSI read from the optical disc, and compulsorily stops a data playback operation upon judging that the disc has been illegally copied. Therefore, it is possible to effectively protect an optical disc from illegal copying, make an accurate and easy distinction between a legally made optical disc and an illegally made optical disc, and restrict reproduction of an illegally made optical disc.

10 Claims, 10 Drawing Sheets

U.S. PATENT DOCUMENTS

| | | | |
|---|---|---|---|
| 6,070,799 | A | 6/2000 | Ashe |
| 6,081,785 | A | 6/2000 | Oshima et al. |
| 6,128,272 | A | 10/2000 | Horimai et al. |
| 6,144,625 | A | 11/2000 | Kuroda et al. |
| 6,266,299 | B1 | 7/2001 | Oshima et al. |
| 6,353,890 | B1 | 3/2002 | Newman |
| 6,532,206 | B2 | 3/2003 | Muramatsu et al. |
| 6,535,477 | B1 | 3/2003 | Muramatsu et al. |
| 6,546,490 | B2 | 4/2003 | Sako et al. |
| 6,549,498 | B1 | 4/2003 | Inoue et al. |
| 6,580,678 | B2 | 6/2003 | Kondo et al. |
| 6,603,720 | B1 | 8/2003 | Kuroda et al. |
| 6,608,804 | B2 | 8/2003 | Shim |
| 6,671,249 | B2 | 12/2003 | Horie |
| 6,683,844 | B2 | 1/2004 | Kuroda |
| 6,694,023 | B1 | 2/2004 | Kim |
| 6,707,774 | B1 | 3/2004 | Kuroda et al. |
| 6,707,785 | B1 | 3/2004 | Kato |
| 6,930,977 | B1 | 8/2005 | Kondo et al. |
| 7,012,859 | B2 | 3/2006 | Park |
| 7,014,815 | B1 | 3/2006 | Worthington et al. |
| 7,028,011 | B1 | 4/2006 | Ha et al. |
| 7,035,172 | B1 | 4/2006 | Murata |
| 7,050,383 | B2 | 5/2006 | Nakajima et al. |
| 7,061,850 | B1 | 6/2006 | Irie et al. |
| 7,215,610 | B2 | 5/2007 | Sako et al. |
| 7,280,461 | B2 | 10/2007 | Endoh |
| 7,302,588 | B2 | 11/2007 | Sako et al. |
| 2001/0007545 | A1 | 7/2001 | Ueda et al. |
| 2001/0014077 | A1 | 8/2001 | Muramatsu et al. |
| 2001/0038603 | A1 | 11/2001 | Kondo et al. |
| 2002/0001274 | A1 | 1/2002 | Nakajima et al. |
| 2002/0021635 | A1 | 2/2002 | Park et al. |
| 2002/0024898 | A1 | 2/2002 | Kamiyama |
| 2002/0024914 | A1 | 2/2002 | Kobayashi |
| 2002/0027855 | A1 | 3/2002 | Shishido et al. |
| 2002/0110067 | A1 | 8/2002 | Kondo et al. |
| 2003/0002427 | A1 | 1/2003 | Lee et al. |
| 2003/0002430 | A1 | 1/2003 | Kim et al. |
| 2003/0012098 | A1 | 1/2003 | Sako et al. |
| 2003/0048705 | A1 | 3/2003 | Wang et al. |
| 2003/0067849 | A1 | 4/2003 | Mikami |
| 2003/0112736 | A1 | 6/2003 | Muramatsu et al. |
| 2005/0111315 | A1 | 5/2005 | Hwang et al. |
| 2005/0213483 | A1 | 9/2005 | Tomita et al. |

FOREIGN PATENT DOCUMENTS

| | | |
|---|---|---|
| CN | 1384491 | 12/2002 |
| EP | 0 299 573 | 7/1988 |
| EP | 0 936 610 A2 | 8/1999 |
| EP | 545472 | 10/1999 |
| EP | 1 168 312 | 9/2000 |
| EP | 1 065 659 | 1/2001 |
| EP | 1081688 | 3/2001 |
| EP | 1 189 213 | 3/2002 |
| EP | 1296328 | 3/2003 |
| JP | 04-274032 | 9/1992 |
| JP | 08-036803 | 2/1996 |
| JP | 10-172149 | 6/1998 |
| JP | 10-177767 | 6/1998 |
| JP | 10-222874 | 8/1998 |
| JP | 10-302381 | 11/1998 |
| JP | 10-326419 | 12/1998 |
| JP | 11-032328 | 2/1999 |
| JP | 11-339268 | 12/1999 |
| JP | 2000-076141 | 3/2000 |
| JP | 2000-113466 | 4/2000 |
| JP | 2000-123479 | 4/2000 |
| JP | 2000-149414 | 5/2000 |
| JP | 2000-231722 | 8/2000 |
| JP | 2001-014796 | 1/2001 |
| JP | 2001-135021 | 5/2001 |
| JP | 2001-189015 | 7/2001 |
| JP | 2001-216727 | 8/2001 |
| JP | 2001-256655 | 9/2001 |
| JP | 2001-325747 | 11/2001 |
| JP | 2001-332031 | 11/2001 |
| JP | 2002-132457 | 5/2002 |
| JP | 2005-266593 | 9/2005 |
| JP | 2006-337763 | 12/2006 |
| KR | 10-1999-0079395 | 11/1999 |
| KR | 10-2001-0085952 | 9/2001 |
| KR | 10-2001-0088053 | 9/2001 |
| KR | 2003-4542 | 1/2003 |
| KR | 2003-30506 | 4/2003 |
| WO | 00/45381 | 8/2000 |
| WO | 01/11890 | 2/2001 |
| WO | WO 01/88917 | 11/2001 |
| WO | 01/95327 | 12/2001 |
| WO | 02/01560 | 1/2002 |
| WO | 02/37493 | 5/2002 |
| WO | 03/094158 | 11/2003 |

OTHER PUBLICATIONS

Philps Electronics; Formatter for prerecorded formats, year 2004.*
Philips Electronics; Formatter for Recordable-Rewritable format, year 2004.*
Internet posting, Understanding the Design of the DVD+RW and DVD+R Disc Format., year 2008 (as printed out).*
Internet posting, Addressing Schemes for Optical Discs, year 2008 (as printed out).*
Key technology for high density rewritable DVD (DVD-RAM) Satoh, I.; Ohara, S.; Akahira, N.; Takenaga, M.; Magnetics, IEEE Transactions on vol. 34, Issue 2, Part 1, Mar. 1998 pp. 337-342.*
Recording and readout using clock marks premastered by groove wobbling Fuji, H.; Maeda, S.; Murakami, Y.; Mieda, M.; Okumura, T.; Sato, H.; Takahashi, A.; Tobita, M.; Magnetics, IEEE Transactions on vol. 36, Issue 3, May 2000 pp. 597-603.*
Advanced optical disk mastering and its application for extremely high-density magnetic recording Kaneda, Y.; Industrial Electronics, IEEE Transactions on vol. 42, Issue 3, Jun. 1995 pp. 257-262.*
International Search Report mailed May 27, 2004 in connection with International Patent Application No. PCT/KR2004/000338.
Office Action issued Dec. 7, 2007 by the Chinese Patent Office in Chinese Patent Application No. 200480007952.0.
International Search Report dated Aug. 22, 2003, for International Application No. PCT/KR03/00867.
International Search Report dated Oct. 23, 2003, for International Application No. PCT/KR03/01292.
European Patent Office Supplementary Search Report dated Feb. 17, 2006, for European Patent Application No. 03736356. 1-2210.
U.S. Patent Office Action dated Feb. 22, 2006, for U.S. Appl. No. 10/790,031.
Patent Office of the People's Republic of China Notice of the First Office Action dated Mar. 17, 2006, for Chinese Patent Application No. 03809910.1.
U.S. Patent Office Action dated Mar. 22, 2006, for U.S. Appl. No. 10/426,020.
U.S. Patent Office Action dated Apr. 10, 2006, for U.S. Appl. No. 10/789,992.
U.S. Patent Office Action dated Sep. 6, 2006, for U.S. Appl. No. 10/986,019.
U.S. Patent Office Action dated Oct. 12, 2006, for U.S. Appl. No. 10/789,992.
Japanese Patent Office Action dated Nov. 26, 2006, for Japanese Patent Application No. 2004-502291.
U.S. Patent Office Action dated Dec. 12, 2006, for U.S. Appl. No. 10/426,020.
U.S. Patent Office Action dated Apr. 27, 2007, for U.S. Appl. No. 10/986,019.
Japanese Patent Office Action dated May 29, 2007, for Japanese Patent Application No. 2004-502291.

U.S. Patent Office Action dated May 31, 2007, for U.S. Appl. No. 10/426,020.
Rospatent Inquiry dated Jul. 6, 2007, for Russian Patent Appl. No. 2004124944/28.
U.S. Patent Office Action dated Jul. 12, 2007, for U.S. Appl. No. 10/789,992.
European Patent Office Examination Report dated Oct. 26, 2007, for European Patent Application No. 03736356.1-1247.
U.S. Patent Office Action dated Aug. 28, 2007, for U.S. Appl. No. 10/426,020.
U.S. Patent Office Action dated Jan. 8, 2008, for U.S. Appl. No. 10/986,019.
Japanese Patent Office Action dated Feb. 12, 2008, for Japanese Patent Application No. 2004-519328.
Rospatent Inquiry dated Feb. 28, 2008, for Russian Patent Application No. 2004124944/28.
U.S. Patent Office Action dated Apr. 22, 2008, for U.S. Appl. No. 10/989,292.
U.S. Patent Office Action dated Apr. 23, 2008, for U.S. Appl. No. 10/789,992.
Office Action for related U.S. Appl. No. 10/426,020 dated Aug. 1, 2008.
Office Action for related European patent application No. 07023886.0-2210 dated Mar. 25, 2008.
Office Action for related Korean patent applicatio No. 10-2007-0042296 dated Jul, 22, 2008.
Office Action for related Korean patent application No. 10-2002-0023983 dated May 30, 2008.
Office Action for related European patent application No. 03721120.8-2210 dated Mar. 14, 2008.
Office Action for related Japanese patent application No. 2005-214336 dated Jun. 3, 2008.
Office Action for Korean patent application No. 10-2002-0037947 dated Sep. 17, 2008.
US Office Action for U.S. Appl. No. 10/986,019 dated Sep. 22, 2008.
Japanese Office Action for JP 2005-214336 dated Sep. 24, 2008.
Office Action for U.S. Appl. No. 10/426,020 dated Jan. 28, 2009.
Office Action for U.S. Appl. No. 11/976,387 dated Feb. 6, 2009.
Office Action for U.S. Appl. No. 10/989,292 dated Dec. 31, 2008.
Office Action for Japanese patent application No. 2005-214336 dated Mar. 10, 2009.

* cited by examiner

- Compliant(legal) and illegal Disc Cases

| Within the Physical ROM Mark Area | CSI in Other Area of Disc |
|---|---|
| Mode 1 : "CPI_Flag(Value=1,CSI_Org)"+"CPI" | CSI_Org |
| Mode 2 : "CPI_Flag(Value=0,CSI_Org)"+"No CPI" | CSI_Org |
| *Mode 3 : "CPI_Flag(Value=0,<u>CSI_1</u>)"+"No CPI"* | CSI_2 |

⇩

*CSI within the physical ROM mark area discords with CSI in other area*

⇩

*( illegally mastered disc )*

RECORDING MEDIUM, APPARATUS FOR FORMING THE RECORDING MEDIUM, AND APPARATUS AND METHOD FOR REPRODUCING THE RECORDING MEDIUM

1. TECHNICAL FIELD

The present invention relates to a recording medium, an apparatus for forming the recording medium, and an apparatus and method for reproducing the recording medium, and more particularly to a high-density optical disc, such as a BD-ROM (Blu-ray Disc-ROM), and an apparatus and method associated therewith.

2. BACKGROUND ART

The recent rapid progress in standardization of a new high-density optical disc, for example, a BD-RE (Blu-ray Disc-Rewritable), capable of recording high-quality video data and high-quality audio data for a lengthy period of time has led to anticipation that the associated products will be developed and commercially available.

Figure 1:
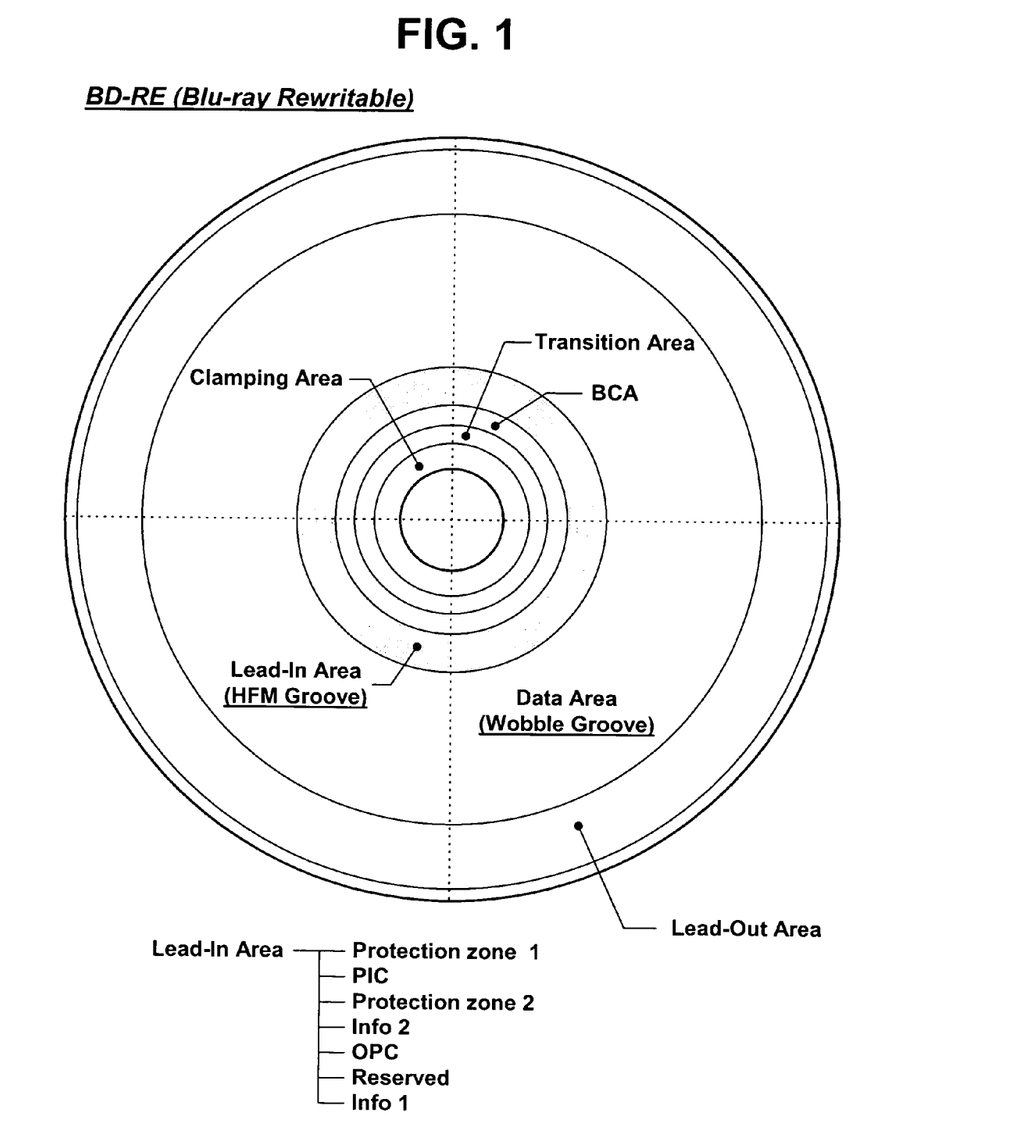
FIG. 1 is a view showing the structure of a BD-RE.

The BD-RE has, as shown in FIG. 1, a clamping area, transition area, burst cutting area (BCA) and lead-in area defined sequentially at the inner periphery thereof, and a data area and lead-out area defined respectively at the intermediate portion and outer periphery thereof.

The lead-in area is partitioned into a first protection zone Protection zone 1, a PIC (Permanent Information & Control data) zone, a second protection zone Protection zone 2, an information 2 zone Info 2, an optimum power control (OPC) zone, etc. Whereas the first protection zone and PIC zone are pre-recorded areas where data is pre-recorded in advance, the remaining zones of the lead-in area, the data area and the lead-out area are rewritable areas where new data is rewritten.

Figure 2:
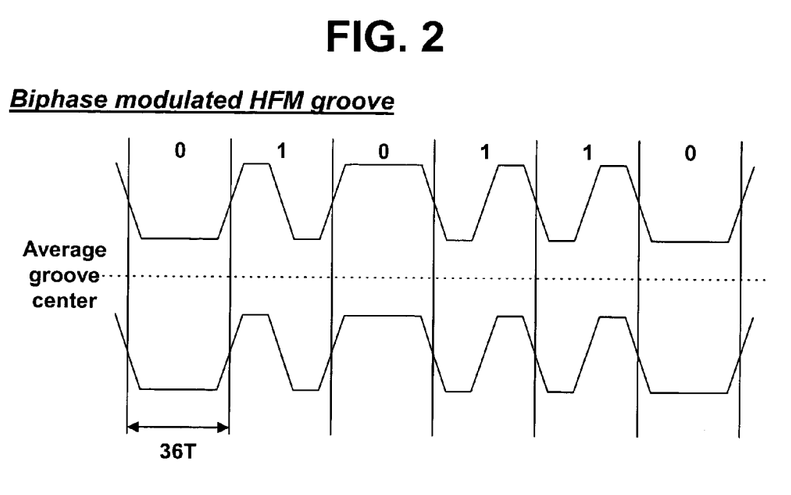
FIG. 2 is a view showing HFM grooves formed in a PIC zone of the BD-RE.

High frequency modulated (HFM) grooves are formed in the PIC zone, in which main information of the disc to be permanently preserved is stored. These HFM grooves are modulated by a bi-phase modulation method to store disc information (DI), as shown in FIG. 2.

HFM Grooves is modulated in the radial direction with a rather high bandwidth signal, to create a data channel for replicated information with sufficient capacity and data rate. As shown in FIG. 2, encoding data into a wobbled groove can be performed by the bi-phase modulation.

In the modulation method, a bit with value 0 may be represented by a transition at the start of the bit cell and a bit with value 1 may be represented by a transition at the start and in the middle of the bit cell. The modulated bits may be recorded on the disc by a deviation of the groove from its average centerline as indicated in FIG. 2. The length of each bit cell may be 36T, where T corresponds to the length of a channel bit in the rewritable data areas.

Meanwhile, the standardization of a new read-only high-density optical disc, as well as the BD-RE, is recently under discussion among the associated companies.

Figure 3:
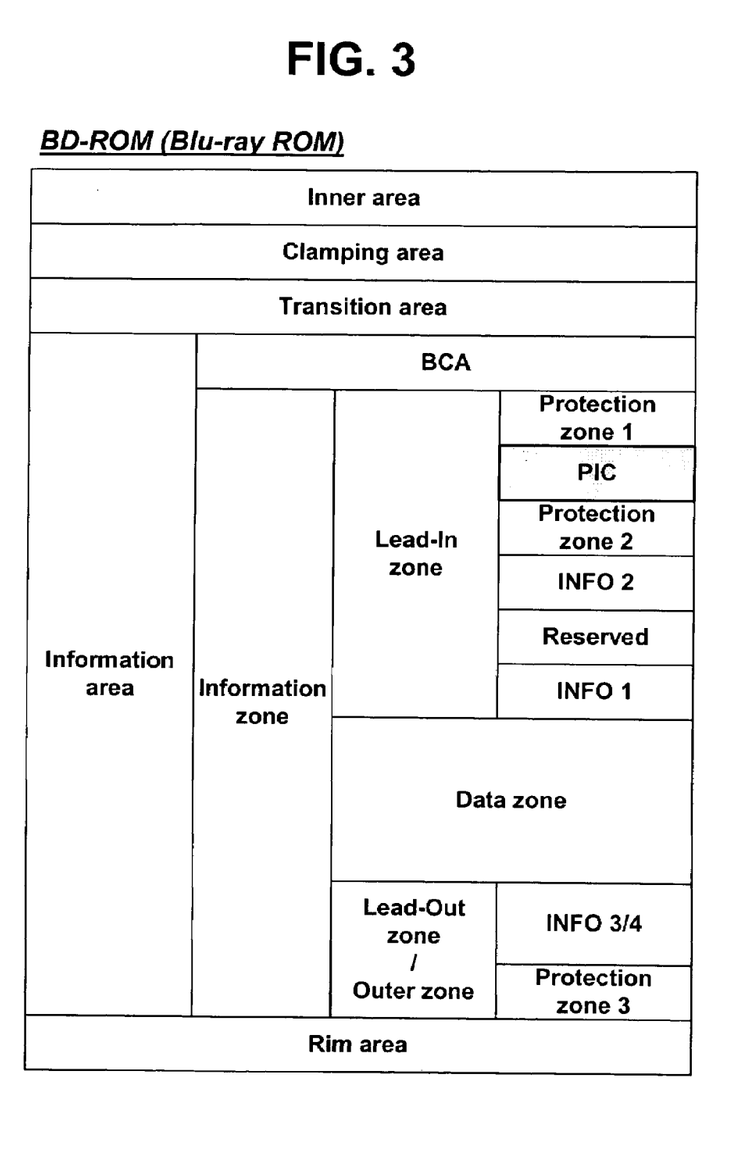
FIG. 3 is a view showing the structure of a BD-ROM.

The new read-only high-density optical disc may be, for example, a BD-ROM, which has, as shown in FIG. 3, an inner area, clamping area, transition area, information area and rim area. The information area includes a data zone where main data, such as an A/V stream, is recorded while being encrypted by CPI (Copy Protection-related Information) for illegal copy protection. The information area further includes a PIC zone for recording the CPI and DI. Therefore, an optical disc device detects the CPI recorded in the PIC zone in initial servo operation, and then reproduces the main data encrypted and recorded in the data zone while decrypting it using the detected CPI.

However, it may be possible to illegally store the BD-ROM data stream decrypted and reproduced by the optical disc device in a storage medium, such as a hard disk drive (HDD) of a personal computer, and illegally make a BD-ROM without CPI using a BD-ROM formatter and mastering machine. In this case, since the illegally made BD-ROM has no CPI, but is recorded with the decrypted data stream, it becomes the same as a legally made BD-ROM that has no CPI and is recorded with an unencrypted data stream. For this reason, it is not possible to make a distinction between the legally made BD-ROM and the illegally made BD-ROM. However, there is currently no efficient solution to such a problem.

3. DISCLOSURE OF INVENTION

Therefore, the present invention has been made in view of the above problem, and it is an object of the present invention to provide an optical disc to which a contents protection system making it hard to illegally copy the disc is applied.

It is another object of the present invention to provide an optical disc which enables an accurate and easy distinction between a legally made optical disc and an illegally made optical disc.

It is a further object of the present invention to provide an apparatus for forming an optical disc, which is capable of effectively protecting the disc from illegal copying.

It is a further object of the present invention to provide an apparatus for forming an optical disc, which is capable of making an accurate distinction between legal copying of the disc and illegal copying thereof.

It is a further object of the present invention to provide an apparatus for forming an optical disc to be not normally reproduced, when illegal copying is attempted.

It is another object of the present invention to provide a reproduction apparatus and method which can make an accurate distinction between a legally made optical disc and an illegally made optical disc.

It is yet another object of the present invention to provide a reproduction apparatus and method which can restrict reproduction of an illegally made optical disc.

In accordance with an aspect of the present invention, the above and other objects can be accomplished by the provision of a recording medium wherein copy protection-related information and identification information indicative of recording or non-recording of the copy protection-related information are recorded in a specific area as a wobbled pre-pit type.

In accordance with another aspect of the present invention, there is provided an apparatus for forming a recording medium, comprising: a copy protection controller for separating control data and main data from a file inputted thereto and generating copy control data.

In accordance with a further aspect of the present invention, there is provided an apparatus for reproducing a recording medium, comprising: a ROM-mark decoder for decoding copy protection-related information and identification information indicative of recording or non-recording of the copy protection-related information read from a specific area of said recording medium; key detector acquiring a decryption key for decryption of main data from the decoded copy protection-related information; decryption unit decrypting the main data using said decryption key; and decoding unit decoding the decrypted main data.

In accordance with another aspect of the present invention, there is provided a method for reproducing a recording medium, comprising the steps of: a) confirming copy protection-related information and identification information indicative of recording or non-recording of the copy protection-related information from a specific area of said recording medium; and b) judging by the confirmed copy protection-related information and identification information whether said recording medium has been illegally copied.

In accordance with yet another aspect of the present invention, there is provided a method for reproducing a recording medium, comprising the steps of: a) detecting a plurality of contents specific information from said recording medium; and b) judging whether said recording medium has been illegally copied, by comparing the plurality of detected contents specific information.

4. BRIEF DESCRIPTION OF DRAWINGS

The accompanying drawings, which are included to provide a further understanding of the invention, illustrate the preferred embodiments of the invention, and together with the description, serve to explain the principles of the present invention.

Features, elements, and aspects of the invention that are referenced by the same numerals in different figures represent the same, equivalent, or similar features, elements, or aspects in accordance with one or more embodiments.

5. MODES FOR CARRYING OUT THE INVENTION

Now, preferred embodiments of a recording medium, an apparatus for forming the recording medium, and an apparatus and method for reproducing the recording medium according to the present invention will be described in detail with reference to the annexed drawings.

A recording medium, for example, a BD-ROM, according to the present invention has an inner area, clamping area, transition area, information area and rim area, as stated previously with reference to FIG. 3.

Figure 4:
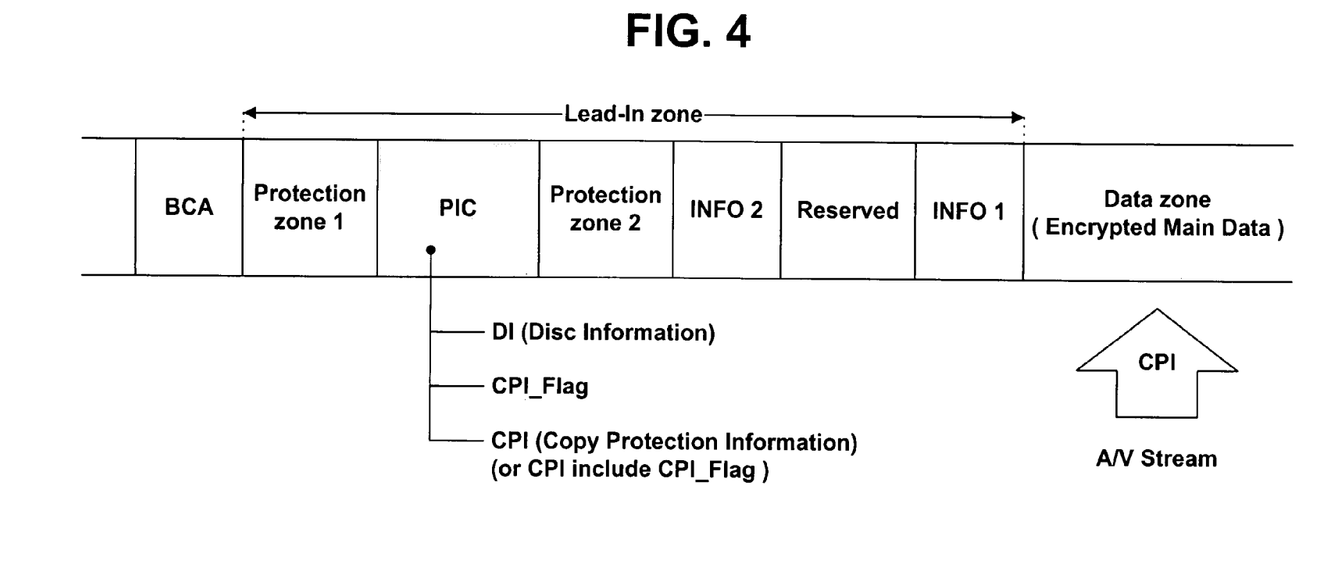
FIG. 4 is a view showing a recorded state of CPI and a CPI flag on a BD-ROM according to a first embodiment of the present invention.

In a first embodiment of the present invention, main information of the disc, or disc information (DI), is recorded in a PIC zone of the information area, as shown in FIG. 4. CPI (Copy Protection-related Information) is further recorded in the PIC zone as a key value for decryption of main data, such as an A/V stream, in the case where the main data is recorded in a data zone of the information area under encryption. No CPI is recorded in the PIC zone in the case where the main data is recorded in the data zone while unencrypted. Identification information indicative of the recording or non-recording of the CPI, for example, a CPI flag CPI_Flag having a size of 1 byte, is recorded in the CPI or separately in the PIC zone.

The CPI is recorded in a bi-phased HFM groove type in the PIC zone in a similar manner to in the above-mentioned BD-RE structure, but in a wobbled pre-pit type bi-phased in the PIC zone in a different manner from in the BD-RE structure. The CPI flag is recordable in the wobbled pre-pit type in the PIC zone, too. Alternatively, the CPI flag may be recorded in a straight pre-pit type.

Details of the CPI flag, the value of the CPI flag, CPI data, and contents specific information (CSI) to be described below are secretly provided by a contents provider, while not externally known. The CPI flag, CPI and CSI are used to protect the disc from illegal copying and restrict reproduction of an illegally copied disc.

Accordingly, the BD-ROM can be made through legal processes in two modes. In mode 1, copy protected contents are recorded on the BD-ROM. Main data is recorded in the data zone while being encrypted, and CPI for decryption of the encrypted main data and a CPI flag, for example, 'CPI_Flag=1', indicative of the recording of the CPI are recorded in the PIC zone. In mode 2, copy free contents are recorded on the BD-ROM. Main data is recorded in the data zone while unencrypted, and only CPI flag, for example, 'CPI_Flag=0', indicative of non-recording of CPI is recorded in the PIC zone.

Figure 5:
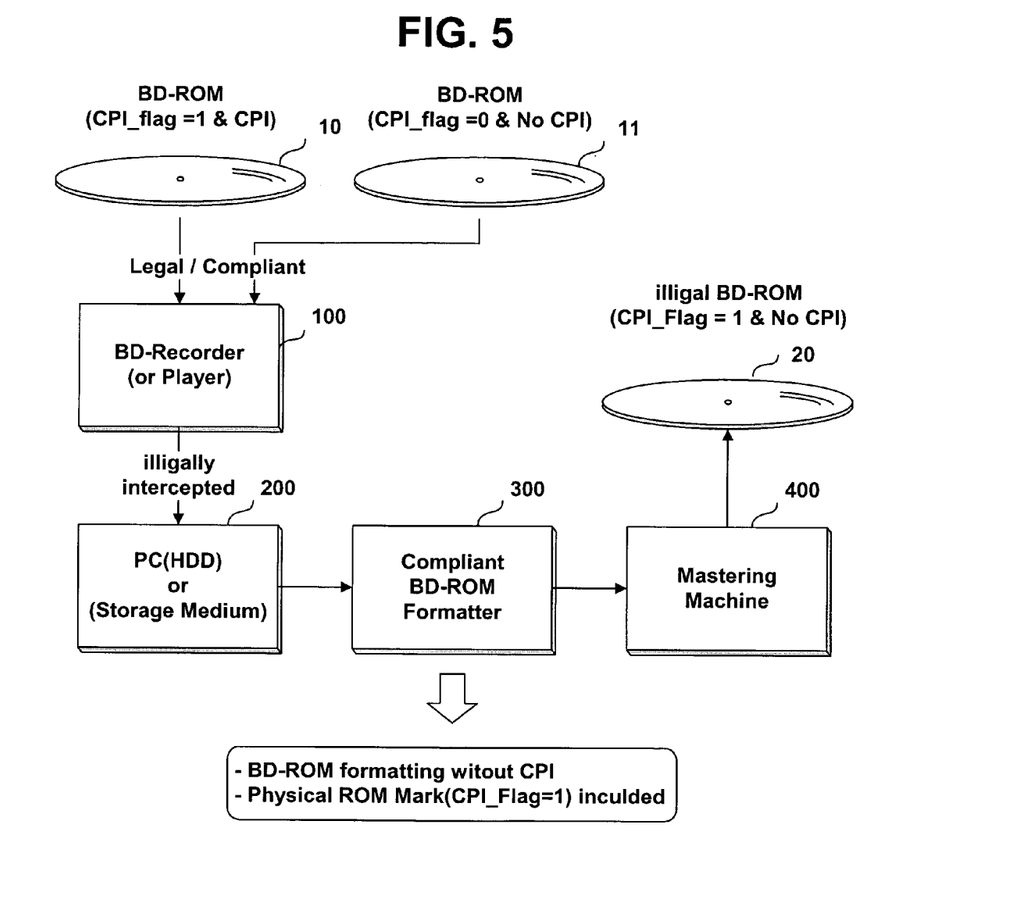
FIG. 5 is a view illustrating a procedure of illegally copying the BD-ROM according to the first embodiment of the present invention.
Figure 6:
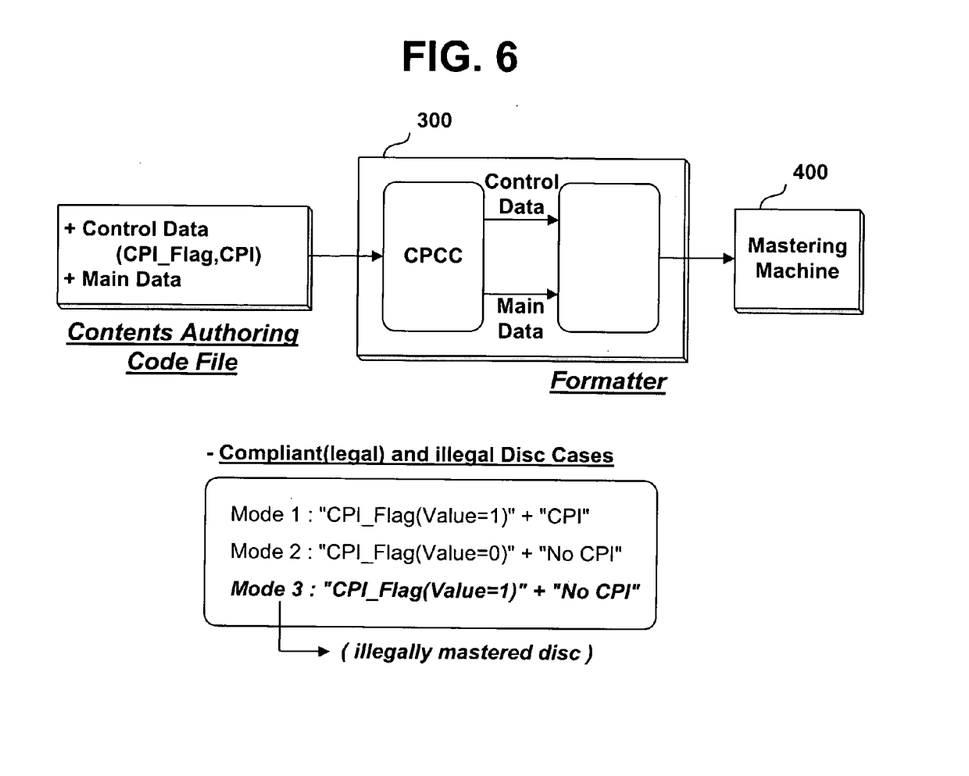
FIG. 6 is a view illustrating the operation of a formatter which copies the BD-ROM according to the first embodiment of the present invention.

FIG. 5 illustrates a procedure of illegally copying the BD-ROM according to the first embodiment of the present invention, and FIG. 6 illustrates the operation of a formatter.

Where the BD-ROM copying is attempted, a BD-ROM made through the legal process (mode 1 or mode 2) is reproduced by an optical disc device 100, such as a BD-ROM recorder or player, while the reproduced data stream is illegally stored in a storage medium 200 such as an HDD of a personal computer. Then, the copying of a BD-ROM 20 is attempted through a BD-ROM formatter 300 and mastering machine 400 on the basis of a data stream stored under decryption as input thereto.

On the other hand, the BD-ROM formatter 300 includes a copy protection control chip (CPCC). Inputted to the CPCC of the BD-ROM formatter 300 is a contents authoring code file provided by the contents provider, which contains control data, such as CPI and a CPI flag, and main data such as an A/V stream. The BD-ROM formatter 300 separates the control data and main data from the inputted contents authoring code file through the CPCC and formats the separated control data and main data such that they are suitable to a BD-ROM standard. Thereafter, the mastering machine 400 makes a mass-copyable master using the output of the BD-ROM formatter 300 inputted thereto.

In this case, if the control data contained in the contents authoring code file is legal, the CPCC outputs the control data in a state of being separated from the main data. However, where the control data is not legal or there is no control data in the contents authoring code file, the CPCC generates and outputs control data containing a CPI flag fixed at 'CPI_Flag=1' and wrong CPI or no CPI.

For legal disc making, a legal contents authoring code file containing control data, such as legal CPI and a legal CPI flag, and main data is applied to the BD-ROM formatter 300. For example, here a disc to be legally made is of a copy protected mode type, legal contents authoring code file containing CPI and 'CPI_Flag=1' is inputted to the BD-ROM formatter 300. Alternatively, where a disc to be legally made is of a copy free mode type, a legal contents authoring code file containing no CPI and only 'CPI_Flag=0' is inputted to the BD-ROM formatter 300. The BD-ROM formatter 300 formats the legal control data and main data separated through the CPCC such that they are suitable to the BD-ROM standard, and the mastering machine 400 makes a master.

However, in the case where the illegal disc copying is attempted, only a data stream, or main data, illegally stored in the storage medium is inputted to the BD-ROM formatter 300, or an illegal contents authoring code file containing the main data and illegal control data is inputted to the BD-ROM formatter 300. In this case, the BD-ROM formatter 300 formats wrong control data containing a CPI flag fixed at 'CPI_Flag=1' and wrong CPI or no CPI, and the main data.

Meanwhile, the CPCC is provided to a licensee normally authorized by a licensor, but may be manufactured by a specific user with intent to illegally copy.

However, since the CPI or an algorithm for generating CPI is secret information that is not open to the public in any case, the illegally manufactured CPCC cannot normally generate the CPI and, even if it can, the generated CPI cannot help radically differing in either format or value from the CPI configured by the licensor. As a result, even though the CPCC is illegally manufactured and used to illegally copy a disc, the disc cannot be normally reproduced.

Figure 7:
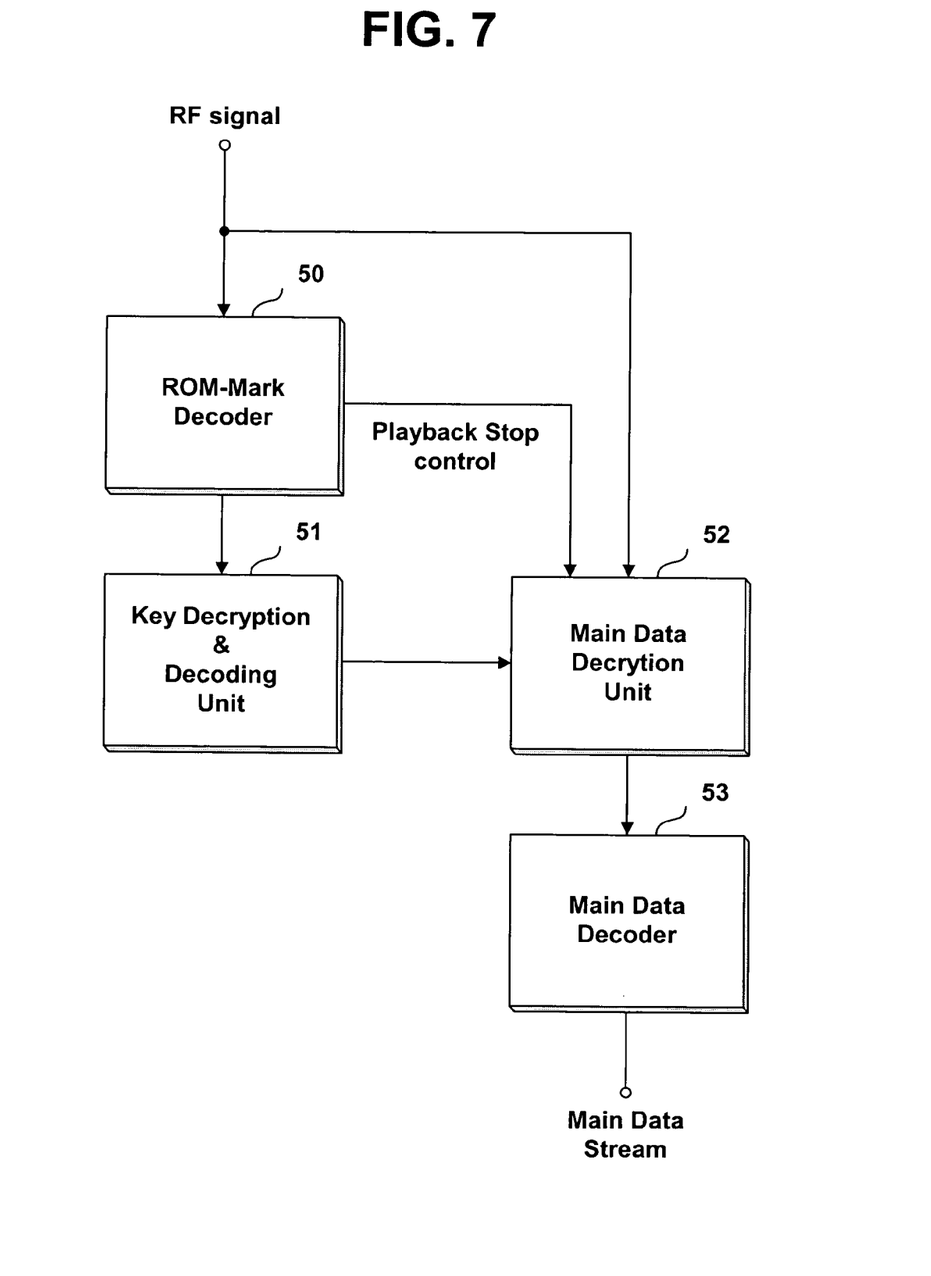
FIG. 7 is a block diagram showing the configuration of an apparatus for reproducing the BD-ROM according to the first embodiment of the present invention while judging whether it is an illegally copied disc.

FIG. 7 is a block diagram showing the configuration of an optical disc device for reproducing the BD-ROM according to the first embodiment of the present invention while judging whether it is an illegally copied disc. As shown in this drawing, the optical disc device comprises a ROM-mark decoder 50, key decryption/decoding unit 51, main data decryption unit 52 and main data decoder 53 in the form of hardware or software.

The ROM-mark decoder 50 acts to decode CPI and a CPI flag recorded in the PIC zone of the BD-ROM, and the key decryption/decoding unit 51 acts to decrypt and decode the CPI into a decryption key value for decryption of main data and output the decryption key value to the main data decryption unit 52. The main data decryption unit 52 acts to decrypt an encrypted main data stream using the decryption key value, and the main data decoder 53 acts to decode the decrypted main data stream into the original data and reproduce the decoded data.

Where CPI_Flag of '1' and normal CPI are recorded in the PIC zone of the BD-ROM, or CPI Flag of '0' and no CPI are recorded in the PIC zone of the BD-ROM, the ROM-mark decoder 50 judges the BD-ROM to be a legally made disc and thus reproduces it continuously. However, where CPI_Flag is recorded as '1' in the PIC zone of the BD-ROM, but no CPI or abnormal CPI is recorded therein, the ROM-mark decoder 50 judges the BD-ROM to have been made through an illegal process and thus outputs a playback stop control signal to the main data decryption unit 52, so as to compulsorily stop the data playback operation.

Figure 8:
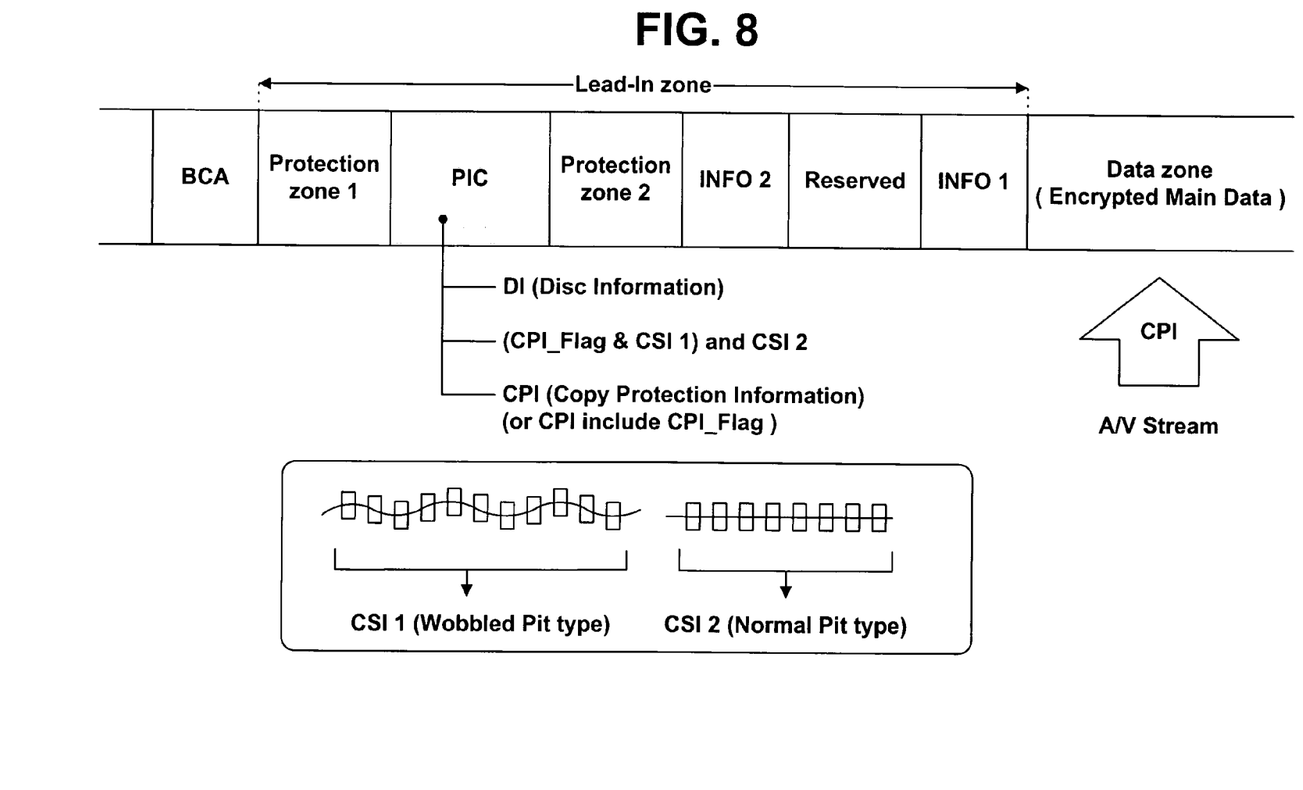
FIG. 8 is a view showing a recorded state of CPI, a CPI flag and contents specific information on a BD-ROM according to a second embodiment of the present invention.

In a BD-ROM according to a second embodiment of the present invention, as shown in FIG. 8, a plurality of contents specific information (CSI), such as Title_ID or Provider_ID etc., are recorded in a PIC zone of a lead-in zone in addition to DI, CPI and CPI_Flag. The CSI 1 and the CSI 2 are separately recorded in different formats. That is, the CSI 1 is recorded, for example, in a wobbled pre-pit type and the CSI 2 is recorded in a general straight pre-pit type. The CSI 2 may be recorded in a zone other than the PIC zone, preferably in the lead-in zone rather than a data zone or lead-out zone.

Figure 9:
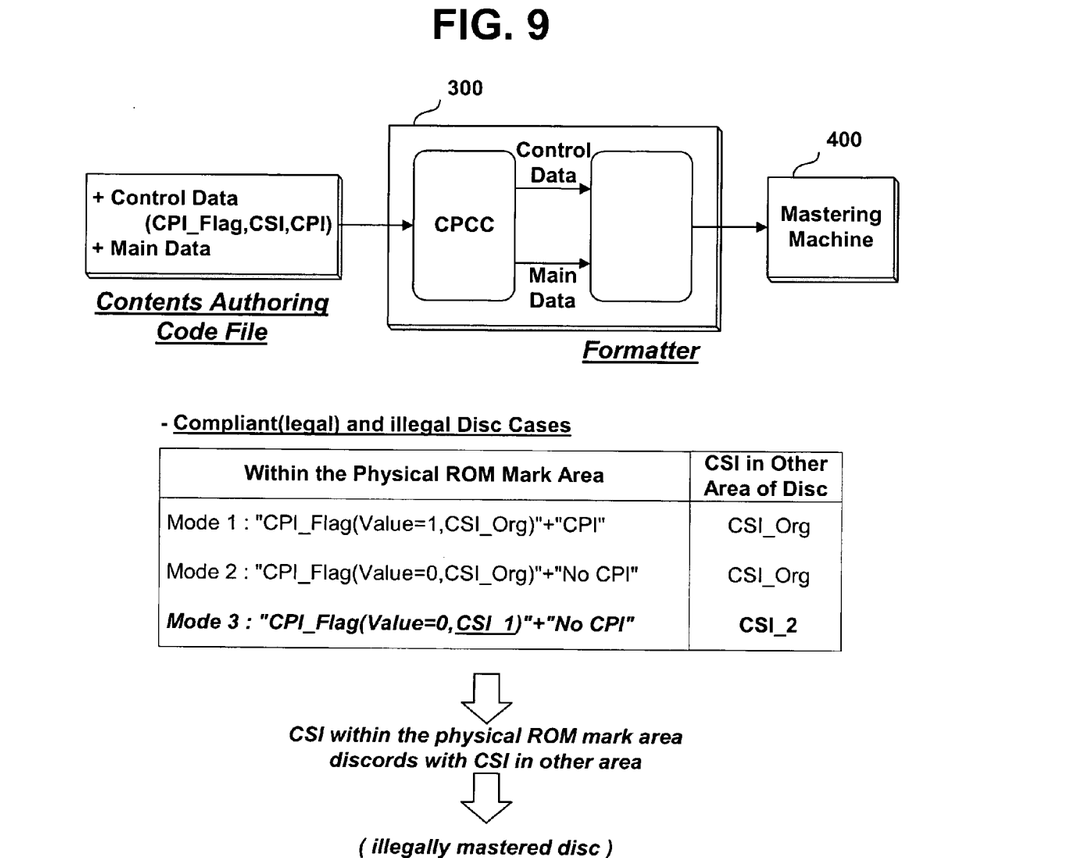
FIG. 9 is a view illustrating the operation of a formatter which copies the BD-ROM according to the second embodiment of the present invention.

FIG. 9 illustrates the operation of a formatter which copies the BD-ROM according to the second embodiment of the present invention.

Inputted to the CPCC of the BD-ROM formatter 300 is a contents authoring code file containing control data, such as CPI_Flag, CSI and CPI, and main data such as an A/V stream. The BD-ROM formatter 300 separates the control data and main data from the inputted contents authoring code file through the CPCC and formats the separated control data and main data such that they are suitable to the BD-ROM standard, as stated previously with reference to FIG. 6.

In this case, if the control data contained in the contents authoring code file is legal, the CPCC outputs the control data in a state of being separated from the main data. Particularly, the CPCC generates the same two (for example, CSI 1 and CSI 2) or more CSI as that contained in the control data and outputs the generated CSI while the CSI 1 being included in outputted control data and the CSI 2, etc. being included in outputted main data. However, where the control data is not legal or there is no control data in the contents authoring code file, the CPCC generates and outputs control data containing a CPI flag fixed at 'CPI_Flag=1' and wrong CPI or no CPI. In particular, in the case where CPI_Flag and CPI are legal, but there is illegal CSI or no CSI contained in the control data, the CPCC generates no CSI or wrong CSI, or generates two or more CSI different each other and outputs the different CSI while one of the generated CSI being included in the outputted control data and the others being included in the outputted main data, respectively.

Figure 10:
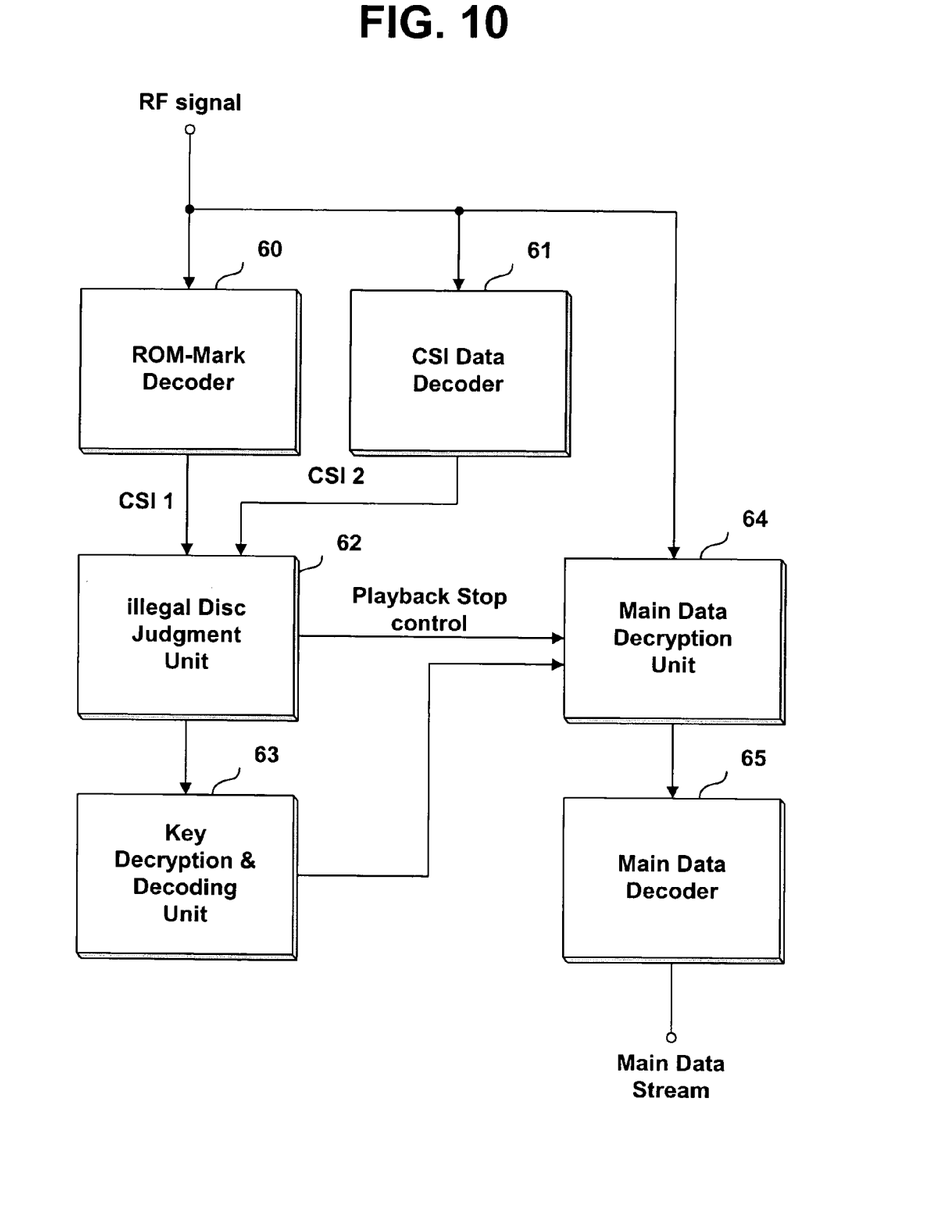
FIG. 10 is a block diagram showing the configuration of an apparatus for reproducing the BD-ROM according to the second embodiment of the present invention while judging whether it is an illegally copied disc.

FIG. 10 is a block diagram showing the configuration of an optical disc device for reproducing the BD-ROM according to the second embodiment of the present invention while judging whether it is an illegally copied disc. As shown in this drawing, the optical disc device comprises a ROM-mark decoder 60, CSI data decoder 61, illegal disc judgment unit 62, key decryption/decoding unit 63, main data decryption unit 64 and main data decoder 65 in the form of hardware or software.

The ROM-mark decoder 50 decodes CPI and CPI_Flag recorded in the PIC zone of the BD-ROM. The decoder 50 also decodes CSI 1 of the wobbled pre-pit type. The CSI data decoder 61 decodes CSI 2 of the straight pre-pit type. If the values of the decoded CSI 1 and CSI 2 are equal, the illegal disc judgment unit 62 judges the BD-ROM to have been made through a legal process and thus reproduces it continuously. However, where no CSI or wrong CSI is recorded in the PIC zone of the BD-ROM, or the values of the decoded CSI 1 and CSI 2 are not equal, the illegal disc judgment unit 62 judges the BD-ROM to have been made through an illegal process and thus outputs a playback stop control signal to the main data decryption unit 64, so as to compulsorily stop the data playback operation.

As apparent from the above description, the present invention provides a recording medium, an apparatus for forming the recording medium, and an apparatus and method for reproducing the recording medium, wherein it is hard to illegally copy an optical disc, and it is possible to make an accurate and easy distinction between a legally made optical disc and an illegally made optical disc. Further, it is possible to effectively protect an optical disc from illegal copying and restrict reproduction of an illegally made optical disc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A computer readable recording medium for use in an apparatus for reproducing data stored in the computer readable recording medium, comprising:
   a specific area in which copy protection-related information and identification information indicative of recording or non-recording of the copy protection-related information are recorded as a wobbled pre-pit type, the copy protection-related information and the identification information causing the apparatus to determine whether or not the data is copied on the computer readable recording medium through a legal process.

2. The computer readable recording medium as set forth in claim 1, wherein said copy protection-related information and said identification information indicative of the recording of said copy protection-related information are recorded together if said recording medium is of a copy protected mode type, and no copy protection-related information and only said identification information indicative of the non-recording of said copy protection-related information are recorded if said recording medium is of a copy free mode type.

3. The computer readable recording medium as set forth in claim 1, wherein said recording medium is a BD-ROM (Blu-ray Disc-ROM).

4. The computer readable recording medium as set forth in claim 3, wherein said specific area is a PIC (Permanent Information & Control data) zone.

5. The computer readable recording medium as set forth in claim 1, wherein said identification information is recorded while included in said copy protection-related information, or recorded in a head of said copy protection-related information.

6. The computer readable recording medium as set forth in claim 1, wherein a plurality of contents specific information with different patterns are further recorded in said recording medium.

7. The computer readable recording medium as set forth in claim 6, wherein the same values are recorded in said plurality of contents specific information in the case where said recording medium is legally copied.

8. The computer readable recording medium as set forth In claim 6, wherein said contents specific information are title IDs of contents.

9. The computer readable recording medium as set forth in claim 6, wherein any one of said plurality of contents specific information is recorded in said wobbled pre-pit type and the remaining contents specific information are recorded in a straight pre-pit type.

10. The computer readable recording medium as set forth in claim 6, wherein said plurality of contents specific information are recorded together in said specific area or separately in said specific area and an area other than said specific area.

\* \* \* \* \*

UNITED STATES PATENT AND TRADEMARK OFFICE
CERTIFICATE OF CORRECTION

| | | |
|---|---|---|
| PATENT NO. | : 7,574,003 B2 | Page 1 of 1 |
| APPLICATION NO. | : 10/780756 | |
| DATED | : August 11, 2009 | |
| INVENTOR(S) | : Jin Yong Kim and Woon Suh | |

It is certified that error appears in the above-identified patent and that said Letters Patent is hereby corrected as shown below:

Col. 1 lines 13-14
Please add the following paragraph:

This U.S. nonprovisional application claims priority under 35 U.S.C. §120 to U.S. Provisional Application no. 60/447,706, filed February 19, 2003, the contents of which are hereby incorporated by reference in its entirety.

Signed and Sealed this
Twenty-second Day of March, 2011

David J. Kappos
*Director of the United States Patent and Trademark Office*